US006304299B1

(12) United States Patent
Frey et al.

(10) Patent No.: US 6,304,299 B1
(45) Date of Patent: Oct. 16, 2001

(54) SYSTEM AND METHOD FOR MITIGATING MULTIPATH EFFECTS IN TELEVISION SYSTEMS

(75) Inventors: Richard Louis Frey, Delanson; Naofal Mohammed Wassel Al-Dhahir, Niskayuna; Mark Lewis Grabb, Burnt Hills; John Anderson Fergus Ross, Niskayuna; John Erik Hershey, Ballston Lake; Nick Andrew Van Stralen, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/201,376

(22) Filed: Nov. 30, 1998

(51) Int. Cl.$^7$ ................................. H04N 5/21; H04N 5/38

(52) U.S. Cl. ............................................. 348/614; 348/21

(58) Field of Search ..................................... 348/614, 611, 348/607, 21, 723, 725, 729; 375/343, 346, 348, 349; H04N 5/38, 5/21

(56) References Cited

U.S. PATENT DOCUMENTS

| | | | | |
|---|---|---|---|---|
| 4,091,418 | * | 5/1978 | Ciciora | 358/160 |
| 4,896,213 | * | 1/1990 | Kobo et al. | 358/147 |
| 5,177,611 | * | 1/1993 | Gibson et al. | 358/167 |
| 5,249,228 | * | 9/1993 | Dieterich | 380/7 |
| 5,361,102 | * | 11/1994 | Roy et al. | 348/611 |
| 5,363,144 | * | 11/1994 | Park | 348/614 |
| 5,530,485 | * | 6/1996 | Kim et al. | 348/611 |
| 5,675,394 | * | 10/1997 | Choi | 348/614 |
| 5,761,088 | * | 6/1998 | Hulyalkar et al. | 348/614 |
| 5,886,748 | * | 3/1999 | Lee | 348/614 |
| 5,973,725 | * | 10/1999 | Lee | 348/21 |

OTHER PUBLICATIONS

"HDTV Research in Japan," David K. Kahaner, IEEE Micro, Oct. 1993, pp. 49–53.

"Design and Selection of a Ghost Cancelling Reference Signal for Television Systems in North America," PT Mathiopoulos and M. Sablatash, Proceedings of Canadian Conference on Electrical and Computer Engineering, Vancouver, BC, Canada, Sep. 14–17, 1993, pp. 660–663.

"Training Signal and Receiver Design for Multi–Path Channel Characterization for TV Broadcasting," J.–D Wang, T.–H S. Chao, B.R. Saltzberg, IEEE Transactions on Consumer Electronics, vol. 36, No. 4, Nov. 1990, pp. 794–806.

"Broadband–CDMA Overlay," D.L. Schilling, G.R. Lomp, J. Garodnick, Proceedings of 1993 IEEE Vehicular Technology Conference (VTC), pp. 452–455.

"Coexistence of DS CDMA PCN and Analog FM: Performance Degradation of the SSSC–FM Channels Due to Spread Spectrum Overlay," K.G. Filis, S.C. Gupta, Proceedings of $2^{nd}$ International Symposium on Personal, Indoor and Mobile Radio Communications, 1992, pp. 665–669.

"The CDMA Overlay Concept," L.B. Milstein, DL Schilling, Proceedings of ISSSTA '95 International Symposium on Spread Spectrum Techniques and Applications, 18996, pp. 476–480.

* cited by examiner

Primary Examiner—Reinhard J. Eisenzopf
Assistant Examiner—Jean W. Désir
(74) Attorney, Agent, or Firm—John F. Thompson; Jill M. Breedlove

(57) ABSTRACT

A wide-band overlay sequence generator adds an overlay signal to a television signal which is transmitted through a channel. At a receiver, a replica of the transmitted overlay sequence is generated and synchronized to the overlay signal in the received signal. An adaptive equalizer filter effectively adjusts the received television signal so that the channel perturbations are removed from the signal.

8 Claims, 4 Drawing Sheets

US 6,304,299 B1

SYSTEM AND METHOD FOR MITIGATING MULTIPATH EFFECTS IN TELEVISION SYSTEMS

BACKGROUND OF THE INVENTION

This invention relates to digital and analog television and, more particularly, to the provision of an overlay signal in a television signal to mitigate multipath effects as the television signal is propagated through space from a transmitter to a receiver.

One of the most important prevalent problems associated with the transmission of television signals is the problem of multipath effects. The term multipath, as used herein, refers to the propagation of electromagnetic waves along various paths from the television transmitter to the television receiver. Multipath effects may arise from fixed structures, such as building walls, acting as reflectors in the transmission channel. Moving objects, such as airplanes, may also cause a multipath condition. Even microreflections in cabling can cause multipath conditions. These structures can cause transmission of the television signal to occur along more than one path from the transmitter to the receiver. As a result, the same television signal may be received more than once, and at different times by one or more television receivers. The result of multipath effects in analog television is to create "ghosts" in the displayed television image. In digital television, the effects of multipath include moderate to severe degradation in the displayed TV picture and sound.

Various methods and systems have been designed to address the problem of multipath. See, for example, P. T. Marhiopoulos and M. Sablatash, "Design of a Ghost Canceling Reference Signal for Television Systems in North America", Proceedings of Canadian Conference on Electrical and Computer Engineering, Vancouver, BC, Canada, Sep. 14–17, 1993, pp. 660–663.

The statistics of multipath ghosts have been studied and compiled by, among others, the BTA (Japan's Broadcasting Technology Association). The BTA, and other concerns, designed a "ghost canceling reference" (GCR) transmitted signal to mitigate these multipath induced effects. The BTA GCR was found to be less than satisfactory in some cases. While homes with outdoor antennas displayed non-varying (stationary) ghosting conditions which could be largely corrected, those homes with indoor antennas experienced changing (dynamic) ghosts. These ghosting conditions were more prevalent where people were moving about the room or other moving objects were in the signal path. The BTA ghost canceller generally was not able to adequately compensate for these dynamic conditions. Therefore, a need remains for a system and method for mitigating multipath effects in television systems, and especially for systems and methods for mitigating multipath effects caused by moving objects and dynamic conditions.

BRIEF SUMMARY OF THE INVENTION

In an exemplary embodiment of the invention, a system for correcting a television signal to mitigate the effects of multipath interference in a television system comprises a first overlay signal generator adapted to provide an overlay signal at an output. The system further comprises an adder for adding the overlay signal output from the first overlay signal generator to a television signal to provide a combined television and overlay signal. The system further comprises a transmitter for broadcasting the combined television signal and overlay signal through a channel; a receiver for receiving the combined television signal and overlay signal; a correlator for detecting periodic correlation peaks in said overlay signal, and an equalizer responsive to the correlator and to the television signal such that multipath effects of the channel on the displayed television image are removed.

A method of mitigating multipath in a television signal comprises the steps of adding an overlay signal to a television signal to provide a combined television signal and overlay signal; broadcasting the combined television and overlay signal over a channel; receiving the broadcast combined television and overlay signals and detecting at least two periodic correlation peaks in the overlay signal. The method further comprises the steps of comparing the at least two periodic correlation peaks to determine characteristics of the channel; and utilizing the determined characteristics of the channel to mitigate multipath effects in the displayed television image.

DETAILED DESCRIPTION OF THE INVENTION

Overview

Figure 1:
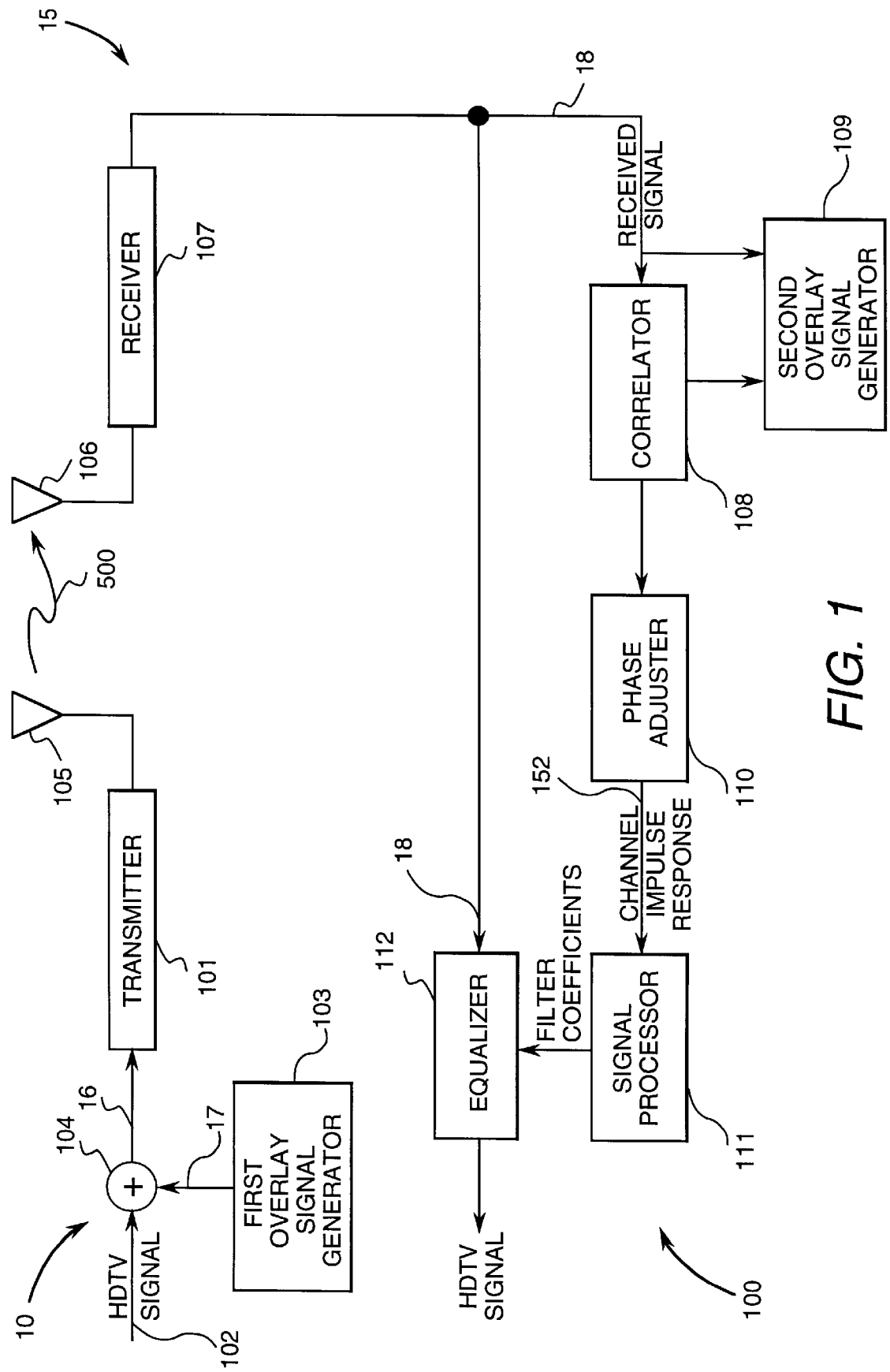
FIG. 1 is a block diagram of one embodiment of the present invention.

Referring now to FIG. 1, a system for mitigating the effects of multipath interference is illustrated in block diagram form. The term "mitigate" as used herein means to remove, to substantially reduce, to substantially cancel, or to substantially eliminate one or more multipath effects impacting a transmitted television signal. The system 100 comprises transmitter subsystem 10 and receiver subsystem 15. Transmitter subsystem 10 includes first overlay signal generator 103 adder 104, and transmitter 101. A television signal 102 to be transmitted is provided to adder 104. In one embodiment of the present invention, television signal 102 is an 8-Vestigal Side Band (VSB) High Definition Television (HDTV) HDTV signal of a type generally known in the art.

Also provided to adder 104 is first overlay signal 17. First overlay signal 17 is generated by first overlay signal generator 103. Adder 104 combines first overlay signal 17 with HDTV signal 102 to produce combined signal 16. Combined signal 16 is provided to transmitter 101 for transmission through space via antenna 105.

Receiver subsystem 15 includes receive antenna 106, receiver 107, correlator 108, second overlay signal generator 109, phase adjuster 110, processor 111 and equalizer 112. Equalizer 112 acts to "undo" multipath effects which may interfere with the HDTV signal as it propagates through transmission channel 500 from transmit antenna 105 to receive antenna 106. As used herein the term channel refers to a transmission path between a transmitter and an antenna. A channel may be characterized by the frequency band of a radio frequency transmission, as well as by the physical characteristics of the propagation path, or paths, taken by the radio frequency transmission.

Transmitter Subsystem

First overlay signal 17 is combined with HDTV signal 102 in order to provide a convenient and highly effective way to accurately characterize a multipath limited channel so that the multipath effects may be mitigated and the ISI (inter-symbol interference) significantly reduced.

First overlay signal 17 is generated by first overlay signal generator 103 of HDTV transmitter subsystem 10. First overlay signal 17 may be analog or digital in nature. In one embodiment of the present invention first overlay signal 17 is a wide band, relatively low power random signal, such as white noise, having an autocorrelation property that will enable useful characterization of the multipath environment. In one embodiment of the present invention first overlay signal 17 is nearly spectrally white, i.e., has a constant noise power spectral density (NPSD). In addition, overlay signal 17 is designed such that its cross-correlation, i.e., degree of similarity, to the HDTV content bearing signal 102 is low. The structure and power of first overlay signal is chosen so that the first overlay signal does not interfere with the HDTV signal, causing degradation in the quality of the HDTV signal. First overlay signal 17 is optimally chosen to interface with other elements in HDTV receiver sets such as any at-aperture distributed antenna element controls that may be present.

Figure 3:
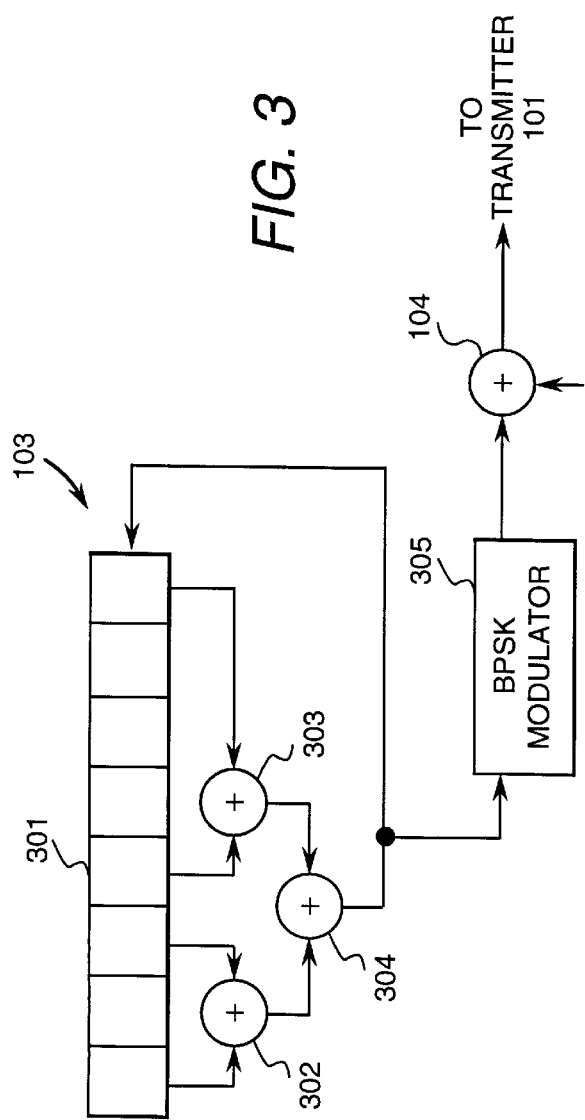
FIG. 3 is a block diagram of an overlay signal generator suitable for use for both the first and second overlay generators shown in FIG. 1.

In one embodiment of the present invention, overlay signal 17 is generated by an overlay signal generator 103 comprising a sequence generator. A suitable sequence generator 103 for generating overlay signal 17 is shown in FIG. 3. In one embodiment of the present invention, sequence generator 103 is an m-sequence generator of the type described in Data Transportation and Protection by John E. Hershey and R. K. Rao Yarlagadda, Chapter 8, pp.273 to 308 (Plenum Press, 1986).

In the example shown in FIG. 3, an 8-bit shift register 301 in combination with Exclusive OR gates 302, 303 and 304 implement what is known in the art as a "primitive polynomial"—$x^8+x^6+x^5+x+1$ for the specific case illustrated—which provides a cycle of $2^8-1=255$ before repeating and a randomly distributed power spectral density, similar to the power spectral density exhibited by noise. The output of Exclusive OR gate 304 is supplied to a binary phase shift keyed (BPSK) modulator 305, the output of which is combined with the HDTV signal by adder 104. In one embodiment of the present invention, the overlay signal 17 is added to the HDTV signal 102 so that the power ratio of the HDTV signal 102 to the overlay signal 17 is approximately 10–20 dB. In one embodiment of the present invention the power ratio is 15 db. This results in minimal, if any, interference.

Referring again to FIG. 1, there is shown a transmitter 101 which receives combined signal 16 from adder 104. Combined signal 16 is an HDTV signal 102 to which a wide-band overlay signal from generator 103 has been added by adder 104. The combined signal, that is the HDTV signal 102 with the overlay signal 17, is converted to a radio frequency (RF) signal and transmitted via transmitting antenna 105.

Figure 4:
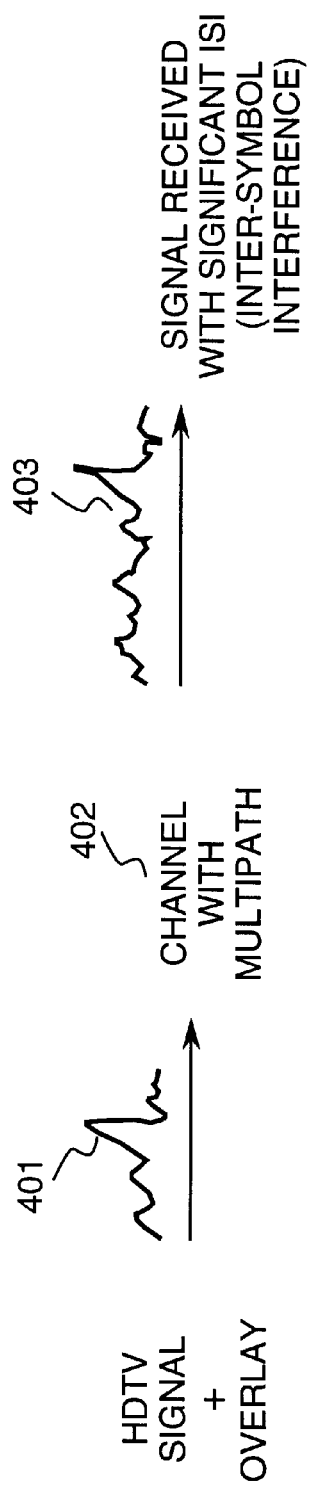
FIG. 4 is a flow diagram illustrating the nature of the combined signal shown in FIG. 1, according to one embodiment of the present invention.

FIG. 4 illustrates overlay signal 401 as it appears before transmission through a channel 402 containing objects which cause multipath effects. The HDTV signal plus the overlay signal 401 is transmitted through a channel 402 or media containing multipath objects. The result is a signal 403 which is received with significant inter-symbol interference (ISI). The transmitted signal is received by any one of a plurality of receiving antennas and, depending on the location of the receiving antenna and the paths of the transmitted signal, there will be different multipath effects on the received signal.

Receiver Subsystem

In the example illustrated in FIG. 1, the transmitted signal is received by receive antenna 106 which, in turn, supplies the received signal to a receiver 107. Antenna 106 and receiver 107 receive and demodulate the received signal to provide demodulated signal 18. In other words, receiver 107 converts the received RF signal to an intermediate frequency (IF) signal which is supplied to a cross-correlator 108 and second overlay sequence generator 109.

Equalizer 112 is an adaptive filter equalizer adapted to receive demodulated signal 18. The response of equalizer 112 to demodulated signal 18 is determined by the filter coefficients of equalizer 112. The filter coefficients are applied to equalizer 112 via conventional adaptive filter taps (not shown). The filter taps of equalizer 112 receive filter coefficients from signal processor 111.

Signal processor 111 estimates the parameters of a model filter that would approximate the channel 500 through which the information of signal 18 is propagated. In other words, signal processor 111 is programmed to determine the filter coefficients for a filter which would cause a signal passing from the input to the output of the filter to undergo the same transformation as a signal passing from the input to the output of the channel. This filter is the model filter. The signal processor 111 then adjusts the coefficients supplied to equalizer 112 to approximate an inverse of the model filter; thus, inverting or undoing the multipath effects originating from the channel.

Signal processor 111 relies upon the channel impulse response signal 152 to derive a very precise knowledge of the channel and thus the model filter. An estimate of the channel, and the model filter, can be derived by comparing the input to the channel (transmitted overlay signal) with the output (received overlay signal) of the channel, since both input and output are known.

In one embodiment of the present invention, a least mean square (LMS) algorithm is employed to estimate the filter coefficients to be provided to equalizer 112. One drawback to this method is that the convergence time of the least mean square (LMS) algorithm is inversely proportional to the smallest eigenvalue of the autocorrelation matrix of the received sequence (input to equalizer 112). On channels with severe multipath and in-band nulls, this smallest eigenvalue becomes very close to zero which slows down the LMS equalizer convergence.

An alternative embodiment of the invention which avoids this ill-conditioned autocorrelation matrix problem is to compute the equalizer coefficients from the channel estimate provided by phase adjuster 110, as illustrated in FIG. 1. This computation is a non-iterative (i.e., one shot) computation that has a closed form and can be easily coded on a commercially available programmable digital signal processor (DSP) chip. The channel estimate is computed from the overlay signal, which is a well-conditioned computation because of the good autocorrelation property (near white spectrum) of the overlay signal.

In one embodiment of the present invention, the optimum equalizer coefficients are computed from the channel impulse response by inverting a correlation matrix whose size is equal to the total (feed forward and feedback) number of equalizer taps, according to methods well known to those of ordinary skill in the signal processing art. These equalizer computation are implemented on a programmable Digital Signal Processor chip according to one embodiment of the present invention. In another embodiment of the present invention, the equalizer computations are implemented by an ASIC.

Second overlay sequence generator 109 is similar to first overlay sequence generator 103 in transmitter subsystem 10. Second overlay sequence generator 109 generates a replica of the transmitted wide-band overlay sequence signal, synchronized to the received overlay sequence signal. Second overlay sequence generator 109 provides an output to cross-correlator 108. The cross-correlator 108 cross-correlates the received HDTV signal and overlay signals (as represented by combined signal 18) against a locally generated overlay signal from generator 109. The output of the cross-correlator 108 is fed to phase adjuster 110 which adjusts the phase of the locally generated overlay signal by retarding or advancing the clocking of the of the locally generated overlay signal to maximize the largest peak out of the cross-correlator 108.

Once the phase of the locally generated overlay signal has been properly aligned, the output of the cross-correlator 108 yields the impulse response of the multipath channel which is then provided to processor 111. Processor 111 computes the equalizer coefficients based on the output of cross-correlator 108 and applies them to equalizer 112. In that regard, equalizer 112 can be described as channel correction filter. The output of the equalizer 112 is the desired HDTV signal.

The operation of system 100 is dynamic. That is, the processor 111 dynamically generates filter coefficients to the equalizer 112 with changing impulse response corresponding to changing channel conditions.

In the correlator 108, a matched filter (not shown) is provided for the m-sequence overlay signal generated by second overlay signal generator 109. Matched filters are well known to those of ordinary skill in the art. In one embodiment of the present invention, receiver 107 will detect a cross-correlation spike from the matched filter every 255 clock times for the m-sequence generator illustrated in FIG. 3, where a clock time is one clock time of the 8-bit shift register. In one embodiment of the present invention, this spike of magnitude 255 is about $10 \log_{10} 255$, or about 24 dB above the overlay signal power level, and 9 dB above the HDTV signal and, therefore, easily detected. Cross-correlator 108 detects other peaks subsequent to this large cross correlation spike. The presence in time relative to the periodic large cross correlation spike, and the magnitudes of such other peaks characterize the multipath effects on the signal received by receiver 107. The characterization information is input to processor 111. Processor 111 utilizes the information to adjust the coefficients of equalizer 112 to cancel the multipath.

Figure 5:
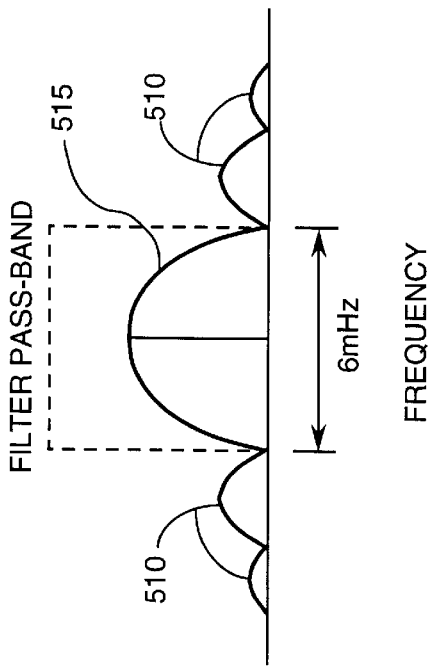
FIG. 5 is a graph illustrating a pass band of the equalizer shown in FIGS. 1 and 2.

The chip rate of the m-sequence generator determines the bandwidth of the overlay signal and the resolution of the multipath components. To keep the signal within 6 MHZ, for one embodiment of the present invention, the shift register 301 (FIG. 3) has a clock rate of 3 Mbps, and the matched filter of the receiver 107 will need a pass band to filter minor lobes 510 as shown in FIG. 5.

Figure 6:
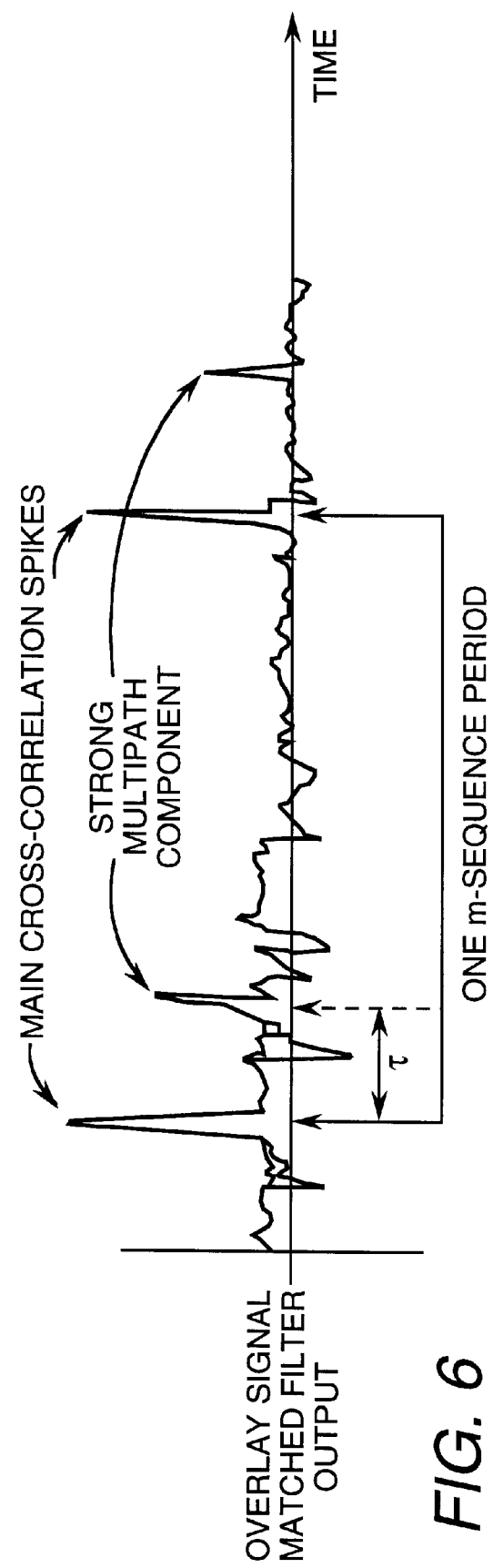
FIG. 6 is a graph showing a multipath component at a delay in the output of the equalizer shown in FIGS. 1 and 2.

The cross-correlator 108 can thus report the impulse response of the HDTV channel by presenting the multipath components and signal strengths, as illustrated for example in FIG. 6. The cross-correlator 108 thus generates an estimate of the impulse response of the multipath, as generally shown in FIG. 6. The estimate provided is a "gross estimate" in that only strong multipath components such as 515 (FIG. 5) are detected, but this is generally satisfactory. Advantageously, this response is dynamic; that is, it changes as the multipath changes.

Figure 2:
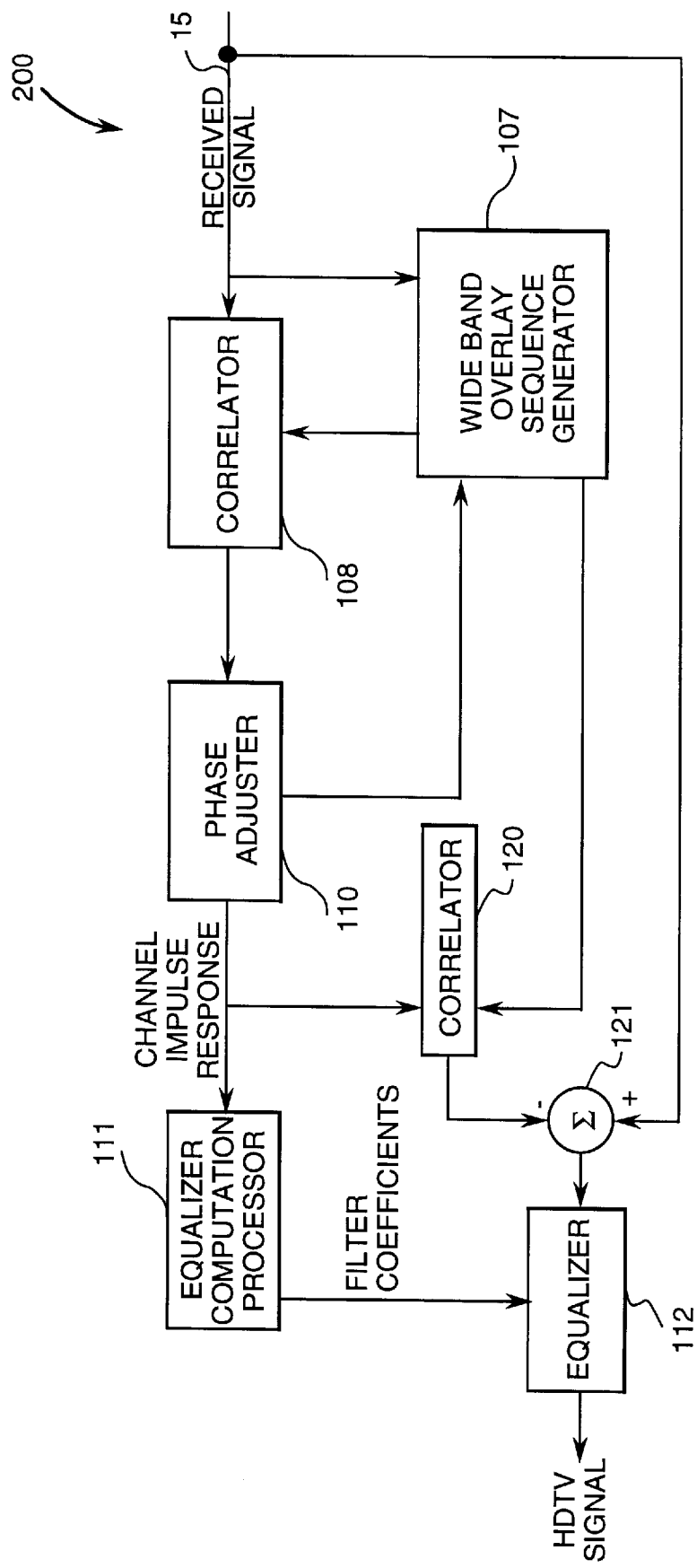
FIG. 2 is a block diagram showing an alternative embodiment of the receiver subsystem shown in FIG. 1.

In the second embodiment shown in FIG. 2, in addition to using an overlay signal 17 to estimate the channel response as described with respect to FIG. 1, the overlay signal 17 and its multipath components are also subtracted out from received signal 15 to mitigate their relatively small interfering effects on the received signal. This is accomplished in one embodiment of the present invention by convolving in convolution processor 120 the locally generated and properly time aligned overlay signal from generator 109 with the estimated channel response from phase adjustor 110. The output of convolution processor 120 is then subtracted from the received signal in summer 121 before the received signal is input to the equalizer 112.

The system and method of the present invention offers a number of advantages over the prior art. First, the receiver subsystem of the present invention continuously monitors the incoming combined signal and adapts to changes in path, or channel conditions. Thus, the system of the present invention is capable of correcting for multipath interference in HDTV signals whether the interference source is a moving object or a stationary object. Further, the system can correct for other dynamic conditions leading to multipath interference such as precipitation or other atmospheric conditions.

While the invention has been described in terms of specific embodiments involving HDTV, those skilled in the art will recognize that the invention can be practiced in conjunction with other television signal formats, and in general with modification within the spirit and scope of the appended claims.

What is claimed is:

1. A method of mitigating multipath effects in a television signal comprising the steps of:

adding an overlay signal to a television signal to provide a combined television and overlay signal, said overlay signal being a wide band random signal of substantially constant noise power spectral density;

broadcasting said combined television and overlay signal over a channel;

receiving said broadcast combined television and overlay signal;

cross-correlating the received combined television and overlay signal with a locally generated replica of the transmitted overlay signal to generate an estimated impulse response signal;

convolving the locally generated replica of the overlay signal with the estimated impulse response signal to generate an approximate signal of the overlay signal and its multipath components;

subtracting the approximate signal of the overlay signal and its multipath components from the received combined television and overlay signal; and equalizing said received combined television and overlay signal such that multipath effects of said channel on said television signal are mitigated.

2. The method of mitigating multipath in a television as recited in claim 1 wherein the overlay signal is an m-sequence signal.

3. The method of mitigating multipath in television signal recited in claim 1 further comprising the steps of:
locally generating a replica of the transmitted overlay signal to produce the locally generated replica of the transmitted overlay signal;
wherein the step of cross-correlating comprises:
cross-correlating the received signal with the locally generated replica of the transmitted overlay signal to generate an estimated impulse response signal;
wherein the step of equalizing comprises:
processing the estimated impulse response signal to generate equalizer coefficients; and
using the equalizer coefficients to dynamically adjust an equalizer which equalizes the received signal.

4. A system for mitigating multipath in a television signal comprising:
a first overlay signal generator for providing an overlay signal at an output, said overlay signal being a wide band random signal of substantially constant noise power spectral density;
an adder for adding said overlay signal from said first overlay signal generator to a television signal to provide a combined television and overlay signal;
a transmitter for broadcasting said combined television and overlay signal through a channel;
a receiver for receiving said combined television and overlay signal;
a correlator for cross-correlating the received combined television and overlay signal with a locally generated replica of the transmitted overlay signal to generate an estimated impulse response signal;
a convolver for convolving the locally generated replica of the overlay signal with the estimated impulse response signal to generate an approximate signal of the overlay signal and its multipath components;
a subtractor for subtracting the approximate signal of the overlay signal and its multipath components from the received combined television and overlay signal; and
an equalizer responsive to said received combined television and overlay signal such that multipath effects of said channel on said television signal are mitigated.

5. The system for mitigating multipath in a television signal recited in claim 4 wherein said first overlay signal generator is an m-sequence generator.

6. The system for mitigating multipath in a television signal recited in claim 4 further comprising:
a local generator for generating a replica of the transmitted overlay signal; and
a processor for processing the estimated impulse response signal to generate equalizer coefficients;
said equalizer using the equalizer coefficients to filter the received signal such that multipath effects on said television signal are mitigated.

7. A method of mitigating multipath effects in a television signal comprising the steps of:
adding an overlay signal to a television signal to provide a combined television and overlay signal, said overlay signal comprising an m-sequence signal;
broadcasting said combined television and overlay signal over a channel; and
receiving said broadcast combined television and overlay signal and detecting at least two periodic correlation peaks in said overlay signal by:
locally generating a replica of the transmitted overlay signal;
cross-correlating the received signal with the locally generated replica of the transmitted overlay signal to generate an estimated impulse response signal and detect at least two periodic correlation peaks in order to determine transmission characteristics of said channel;
convolving the locally generated overlay signal with the estimated impulse response signal to generate an approximate signal of the overlay signal and its multipath components;
processing the estimated impulse response signal to generate equalizer coefficients;
subtracting the approximate signal of the overlay signal and its multipath components from the received signal before inputting the received signal to the equalizer; and
using the equalizer coefficients to dynamically adjust an equalizer which equalizes the received signal, thereby utilizing the transmission characteristics of said channel to mitigate multipath effects in said television signal.

8. A system for mitigating multipath in a television signal comprising:
an m-sequence overlay signal generator for providing an overlay signal at an output;
an adder for adding said overlay signal to a television signal to provide a combined television and overlay signal;
a transmitter for broadcasting said combined television and overlay signal through a channel; and
a receiver for receiving said combined television and overlay signal, said receiver including;
a local generator for generating a replica of the transmitted overlay signal;
a correlator for cross-correlating the received signal with the locally generated replica of the transmitted overlay signal to generate an estimated impulse response signal;
an equalizer;
a processor for processing the estimated impulse response signal to generate equalizer coefficients;
said equalizer being adapted to use the equalizer coefficients to filter the received signal such that multipath effects of said channel on said television signal are mitigated;
a convolver for convolving the locally generated replica of the transmitted overlay signal with the estimated impulse response signal to generate an approximation of the overlay signal and its multipath components; and
a subtractor for subtracting the approximation of the overlay signal and its multipath components from the received signal before inputting the received signal to the equalizer.

* * * * *